United States Patent
Uhrhan et al.

(10) Patent No.: US 9,918,486 B2
(45) Date of Patent: Mar. 20, 2018

(54) FOOD COMPOSITIONS HAVING A REALISTIC MEAT-LIKE APPEARANCE, FEEL, AND TEXTURE

(71) Applicants: Richard B. Uhrhan, Columbia, IL (US); David W. Kuehnle, Ballwin, MO (US)

(72) Inventors: Richard B. Uhrhan, Columbia, IL (US); David W. Kuehnle, Ballwin, MO (US)

(73) Assignee: NESTEC SA, Vevey (CH)

( * ) Notice: Subject to any disclaimer, the term of this patent is extended or adjusted under 35 U.S.C. 154(b) by 671 days.

(21) Appl. No.: 13/736,311

(22) Filed: Jan. 8, 2013

(65) Prior Publication Data

US 2013/0122181 A1    May 16, 2013

Related U.S. Application Data

(62) Division of application No. 12/381,548, filed on Mar. 13, 2009.

(51) Int. Cl.
| | |
|---|---|
| A23J 3/22 | (2006.01) |
| A23K 40/25 | (2016.01) |
| A23K 40/20 | (2016.01) |
| A23K 10/20 | (2016.01) |
| A23K 50/42 | (2016.01) |
| A23L 13/40 | (2016.01) |

(52) U.S. Cl.
CPC ............... *A23J 3/227* (2013.01); *A23K 10/20* (2016.05); *A23K 40/20* (2016.05); *A23K 40/25* (2016.05); *A23K 50/42* (2016.05); *A23L 13/424* (2016.08); *A23L 13/426* (2016.08); *A23L 13/428* (2016.08)

(58) Field of Classification Search
CPC ......... A23J 3/227; A23K 10/20; A23K 40/20; A23K 40/25; A23K 50/42; A23L 13/424; A23L 13/428; A23L 13/426
USPC ................................................ 426/646, 465
See application file for complete search history.

(56) References Cited

U.S. PATENT DOCUMENTS

| | | | |
|---|---|---|---|
| 3,908,025 A * | 9/1975 | Miller et al. | 426/623 |
| 4,029,823 A | 6/1977 | Bone | |
| 4,044,157 A * | 8/1977 | Wilding | 426/250 |
| 4,391,829 A | 7/1983 | Spradlin et al. | |
| 4,418,086 A | 11/1983 | Marino | |
| 4,784,860 A | 11/1988 | Christensen et al. | |
| 4,910,025 A | 5/1990 | Lee et al. | |
| 5,607,710 A | 3/1997 | De Ruyter et al. | |
| 5,676,987 A | 10/1997 | Lai | |
| 5,869,121 A | 2/1999 | Brescia et al. | |
| 6,379,738 B1 | 4/2002 | Dingman et al. | |
| 6,635,301 B1 | 10/2003 | Howsam | |
| 6,649,206 B2 | 11/2003 | Dingman et al. | |
| 6,929,793 B2 | 8/2005 | Spivey-Krobath et al. | |
| 7,070,827 B2 | 7/2006 | Cavillini et al. | |
| 7,189,390 B2 | 3/2007 | Zink et al. | |
| 2001/0053405 A1 | 12/2001 | Cheuk et al. | |
| 2006/0035003 A1 | 2/2006 | McMindes et al. | |
| 2006/0105098 A1 * | 5/2006 | Merrick | 426/656 |
| 2006/0134183 A1 | 6/2006 | Huetter et al. | |
| 2006/0141125 A1 | 6/2006 | Gifford | |
| 2007/0009647 A1 * | 1/2007 | Huetter et al. | 426/635 |
| 2008/0175957 A1 | 7/2008 | Horgan et al. | |
| 2008/0280274 A1 | 11/2008 | Friesen et al. | |

FOREIGN PATENT DOCUMENTS

| | | |
|---|---|---|
| CN | 101068473 | 6/2006 |
| CN | 101232802 | 6/2006 |
| EP | 1143806 | 4/2006 |
| EP | 1296565 | 8/2006 |
| EP | 1482811 | 8/2006 |
| EP | 1213970 | 6/2008 |
| JP | 47020372 | 6/1972 |
| JP | 4738462 | 12/1972 |
| JP | 58040048 | 3/1983 |
| JP | 58043750 | 7/1983 |
| JP | 62107748 | 11/1988 |
| JP | 2002501730 | 8/1999 |
| JP | 2002543818 | 11/2000 |
| JP | 2003518373 | 7/2001 |
| JP | 2008508902 | 2/2006 |
| JP | 2006158265 | 6/2006 |
| JP | 2007184621 | 7/2007 |
| RU | 2086163 | 8/1997 |
| SU | 15050427 | 9/1989 |
| WO | 9938388 | 8/1999 |
| WO | 0069276 | 11/2000 |
| WO | 200145370 | 7/2001 |
| WO | 2004016097 | 2/2004 |
| WO | 2006020886 | 2/2006 |

OTHER PUBLICATIONS

International Search Report & Written Opinion; PCT/US09/06747, dated Mar. 3, 2010.

* cited by examiner

*Primary Examiner* — Vera Stulii

(57) ABSTRACT

The invention provides novel food compositions having a realistic meat-like appearance, feel, and texture. The compositions comprise from about 40 to about 90% functional proteins, from about 0.05 to about 2% of one or more cross-linking agents, and from about 60 to about 10% of a meat slurry, wherein the meat slurry comprises meat and one or more humectants plasticizers in a meat:humectant plasticizer ratio of from about 20:80 to about 80:20. The compositions are produced by heating a preconditioned mixture of the food components under pressure and then expanding the heated composition to form the food composition.

21 Claims, No Drawings

FOOD COMPOSITIONS HAVING A REALISTIC MEAT-LIKE APPEARANCE, FEEL, AND TEXTURE

CROSS-REFERENCE TO RELATED APPLICATIONS

This application is a divisional application of U.S. application Ser. No. 12/381,548, filed on Mar. 13, 2009, that claims priority to U.S. Application No. 61/204,182 filed on Jan. 2, 2009, the disclosures of which are incorporated herein by this reference.

BACKGROUND OF THE INVENTION

Field of the Invention

The invention relates generally to food compositions and particularly to food compositions having a meat-like appearance, feel, and texture and to methods of making such food compositions.

Description of Related Art

Some food compositions having a meat-like appearance and methods of making such food compositions are known in the art. For example, U.S. Pat. No. 4,910,025 discloses a simulated ground meat analog derived from sprouted whole grain kernels and the process for making the analog. U.S. Pat. No. 5,607,710 discloses a method and apparatus for forming meat analog products and for texturizing a dough mass wherein the ingredients are mixed, passed through a conduit having a decreasing cross-sectional area while the dough mass is heated therein, the heating being done such that a greater heat intensity is applied to the center of the dough mass than to the dough mass adjacent the waits of the conduit. U.S. Pat. No. 5,676,987 discloses low-fat meat foods with much of the flavor and physical properties of conventional full-fat meat foods. U.S. Pat. No. 7,070,827 discloses a process for making a vegetable base meat analog that can be used in a variety of vegetarian food products, such as burger patties and sausages. US2006105098A1 discloses a method of manufacturing a texturised proteinaceous meat analogue having & relative water activity of less man about 0.8, comprising proteinaceous materials selected from the group consisting of detailed soy flour, soy meal soy concentrate, cereal gluten (in vital or starch containing form) and egg white powder, edible binding and cross-linking compounds, and a humectant of glycerol and glucose, and the products thereof. The mixture is convened info hot lava, extruded and cooled. US2006141125A1 discloses a proteinaceous meat analogue, for incorporation into packaged pet foods, wherein said meat analogue consists of particles of internally texturised, proteinaceous extrudate material dispersed in a gelled matrix composed of ground meat-based and cereal-based materials: wherein the moisture content of said extrudate and said matrix are different; and wherein the internal texturisation of said extrudate has a fibrous structure. Also disclosed is a method of preparing said analogue. U.S. Pat. No. 5,869,121 discloses a moisture-reduced, formulated food product that has a soft, resilient texture and that simulates the appearance of cooked meat. U.S. Pat. No. 6,379,738 and U.S. Pat. No. 6,649,206 disclose methods for producing meat emulsion products that have a realistic fiber definition. The products have a body member including protein and fat and have a plurality of linear strands of fiber-like material affording the meat emulsion product a realistic meat-like appearance.

Generally, food compositions that have a meat-like appearance, feel, and texture require the addition of water to create the soft meat-like appearance, feel, and texture. These food compositions must be hermetically sealed and sterilized to be shelf stable, generally by retorting a sealed container containing the compositions. Typically, these food compositions are classified as "wet" food compositions by the food industry. To adapt these food compositions and produce "dry" food compositions requires even higher levels of water. For such dry compositions to be shelf stable, preservatives must be added to prevent spoilage. Unfortunately, the soft texture of these dry compositions is quickly lost, possibly due to loss of moisture. Without the soft texture, these compositions do not have an acceptable meat-like appearance, feel, and texture and are therefore not very appealing or palatable. There is, therefore, a need for new food compositions that have and retain a realistic meat-like appearance, feel, and texture.

SUMMARY OF THE INVENTION

It is, therefore, an object of the present invention to provide new food compositions having a meat-like appearance, feel, and texture.

It is another object of the invention to provide methods for producing food compositions having a meat-like appearance, feel, and texture.

It is another object of the invention to provide new food compositions with enhanced palatability.

It is another object of the invention to provide blended food compositions with enhanced palatability.

One or more of these or other objects are achieved using novel food compositions having a realistic meat-like appearance, feel, and texture comprising from about 40 to about 90% functional proteins, from about 0.05 to about 2% of one or more cross-linking agents, and from about 60 to about 10% of a meat slurry, wherein the meat slurry comprises meat and one or more humectant plasticixers in a meat: humectant plasticixer ratio of from about 20:80 to about 80:20. The compositions are produced by heating a preconditioned mixture of the food components under pressure and then expanding the healed composition to form the food composition. The new food composition is highly palatable and can be fed alone or blended with other comestible foods to enhance the palatability of the blend.

DETAILED DESCRIPTION OF THE INVENTION

Definitions

The term "animal" means any animal that could benefit from or enjoy the consumption of food compositions of the present invention, including human, avian, bovine, canine, equine, feline, hicrine, lupine, murine, piscine, ovine, or porcine animals.

The term "companion animal" means domesticated animals such as cats, dogs, rabbits, guinea pigs, ferrets, hamsters, mice, gerbils, horses, cows, goats, sheep, donkeys, pigs, and the like.

The term "food composition" means a product or composition that is intended for ingestion by an animal.

The term "meat" means edible flesh of animals including avian, piscine, bovine, equine, ovine, or porcine animals. Meat includes muscle tissue, mechanically deboned tissue, organs, or combinations thereof.

The term "functional proteins" means (1) undenatured or partially denatured proteins that affect the structure of a food composition after heating or (2) a mixture comprising from about 20 to about 80% of undenatured proteins that affect the structure of a food composition after heating and from about 80 to about: 20% of other proteins.

The term "Aw" means water activity.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual food compositions physically associated such that they are considered a unit for manufacture, distribution, sale, or use.

The term "virtual package" means that the components of a kit are associated by directions on one or more physical or virtual kit components instructing the user how to obtain the other components, e.g., in a bag or other container containing one component and directions instructing the user to go to a website, contact a recorded message or a fax-back service, view a visual message, or contact a caregiver or instructor to obtain instructions on how to use the kit or safety or technical information about one or more components of a kit.

All percentages expressed herein are by weight of the total weight of the composition unless expressed otherwise.

All ratios expressed herein are on a weight:weight basis unless expressed otherwise.

As used herein, ranges are used herein in shorthand, so as to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a supplement", "a method", or "a food" includes a plurality of such "supplements", "methods", or "foods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples" particularly when followed by a listing of terms, is merely exemplary and illustrative and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, ail technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides food compositions having a realistic meat-like appearance, feel, and texture. The compositions comprise from about 40 to about 90% functional proteins, from about 0.05 to about 2% of one or more cross-linking agents, and from about 60 to about 10% of a meat slurry, wherein the meat slurry comprises meat and one or more humectant plasticizers in a meat:humectant plasticizer ratio of from about 20:80 to about 80:20, preferably from about from about 30:70 to about 70:30, preferably from about 40:60 to about 60:40. The invention is based upon the discovery that heating specific amounts of a mixture of functional proteins, cross-linking agents, and a meat slurry that has a specific amount of meat and humectant plasticizers results in a food composition that has a realistic meat-like appearance, feel, and texture. In addition, the food compositions are highly palatable compared to other similar food compositions. Further, the food compositions have a moisture content and water activity that eliminates or minimizes spoilage and eliminates the need artificial preservatives such as mold inhibitors.

In various embodiments, the functional proteins are legume proteins, cereal proteins, or combinations thereof. In a preferred embodiment, the functional proteins are legume proteins. In other embodiments, functional proteins are a mixture of (1) from about 20 to about 80% of legume proteins, cereal proteins, or combinations thereof and (2) from about 80 to about 20% of one or more other proteins, e.g., vegetable proteins such as soybean meal, corn gluten, rice gluten, and meat protein meals such as beef, chicken, turkey, and fish meals. The components of the functional proteins comprise, in various embodiments, many combinations of the ingredients.

The cross-linking agents can be any cross-linking agent suitable for use with the food compositions. Useful, cross-linking agents include elemental sulfur, sodium metabisulfite, cysteine, or combinations thereof.

The humectant plasticizers can be any humectant plasticizers that have humectant properties and that are compatible with the food compositions. In various embodiments, the humectant plasticizers are polyols. In preferred embodiments, the humectant plasticizers are one or more of glycerol (glycerin), sorbitol, propylene glycol, butylene glycol, polydextrose, or combinations thereof, in various embodiments, the humectant plasticizers comprise from about 5 to about 25% of the food composition, from about 8 to about 20%, from about 9 to about 15%, from about 6 to about 15%, and from about 6 to about 12% of the food compositions.

In various embodiments, the functional proteins comprise from about 40 to about 70% and the meat slurry comprises from about 60 to about 30% of the food compositions, in others, the functional proteins comprise from about 40 to about 60% and the meat slurry comprises from about 60 to about 40% of the food compositions. In still others, the functional proteins comprise from about 45 to about 65% and the meat slurry comprises from about 65 to about 45% of the food compositions. In one embodiment, the functional proteins comprise about 50% and the meat slurry comprises about 50% of the food compositions.

In various embodiments, the functional proteins comprise from about 40 to about 60% and the meat slurry comprises from about 60 to about 40% of the food compositions. In others, the functional proteins comprise from about 45 to about 65% and the meat slurry comprises from about 65 to about 45% of the food compositions. In one embodiment, the functional proteins comprise about 50% and the meat slurry comprises about 50% of the food compositions.

In various embodiments, the meat:humectant plasticizer ratio is about 40:60, 45:55, and 50:50. Preferably, the meat:humectant plasticizer ratio is about ratio of 45:55, most preferably about 50:50.

In various embodiments, the food compositions have an Aw of about 0.7 or less, preferably about 0.65 or less. In preferred embodiments, the food compositions have an Aw of from about 0.4 to about 0.7, preferably front about 0.45 to about 0.65, most preferably from about 0.5 to about 0.62.

In various embodiments, the food compositions have a moisture content of about 14% or less, preferably about 12% or less, most preferably about 10% or less. In preferred embodiments, the food compositions have a moisture content of from about 4 to about 14%, preferably from about 6 to about 12%, most preferably from about 8 to about 10%.

In certain embodiments, the humectant plasticizers comprise from, about 6 to about 15% of the food composition, the Aw of the food composition is about 0.62 or less, and the moisture content of the food composition is from about 6 to about 14%.

The meat used to make the meat slurry can be any edible meat, from the tissue of any suitable animal. Preferably, the meal is tissue from an avian, bovine, ovine, porcine, piscine, or combinations thereof.

In various embodiments, the compositions comprise additional ingredients such as vitamins, minerals, amino acids, nucleic acids, fillers, palatability enhancers, binding agents, flavors, stabilizers, emulsifiers, sweeteners, colorants (e.g., titanium dioxide), buffers, salts, coatings, condiments, preservatives, and the like known to skilled artisans. Non-limiting examples of supplementary minerals include calcium, phosphorous, potassium, sodium, iron, chloride, boron, copper, zinc, magnesium, manganese, iodine, selenium, and the like. Non-limiting examples of supplementary vitamins include vitamin A, any of the B vitamins, vitamin C, vitamin D, vitamin E, and vitamin K, including various salts, esters, or other derivatives of the foregoing. Additional dietary supplements may also be included, for example, any form of niacin, pantothenic acid, inulin, folic acid, biotin, amino acids, and the like, as well as salts and derivatives thereof. Stabilizers include substances that tend to increase the shelf life of the composition such as preservatives, synergists and sequestrants, packaging gases, emulsifiers, thickeners, and gelling agents. Examples of emulsifiers and/or thickening agents include gelatin, cellulose ethers, starch, starch esters, starch ethers, and modified starches. Selection of the ingredients and their amounts is known to skilled artisans. Specific amounts for each additional ingredient will depend on a variety of factors such as the ingredient included in the composition; the species of animal; the animal's age, body weight, general health, sex, and diet; the animal's consumption rate; the purpose for which the food composition is being administered to the animal; and the like. Therefore, the component and ingredient amounts may vary widely and may deviate from the preferred proportions described herein, in such embodiments, such additional ingredients typically comprise from about 0.01 to about 20% of the food composition, preferably from about 0.01 to about 15%.

In one embodiment, the food compositions are formulated to provide "complete and balanced" nutrition for an animal, preferably a companion animal, according to standards established by the Association of American Feed Control Officials ("AAFCO"). In another embodiment, the food composition is a pet food composition. In preferred embodiments, the food compositions are nutritionally complete and provide a balanced diet, i.e., the food composition includes vitamins and minerals at the recommended daily levels. Such food composition can be fed solely or blended in various proportions with other food ingredients, e.g., dry petfood kibbles suitable for dogs or cats. Alternatively, the food compositions can be formulated as a treat that is not nutritionally complete.

In various embodiments, the food compositions contain one or more probioties. In other embodiments, the food compositions contain (1) one or more killed or inactivated probioties, (2) components of the killed or inactivated probioties that promote health benefits similar to or the same as the live probioties, or (3) combinations thereof. The probioties or their components can be integrated into the food compositions (e.g., uniformly or non-uniformly distributed in the composition) or applied to the food compositions (e.g., topically applied with or without a carrier). In one embodiment, the probioties are encapsulated in a carrier. Typical probioties include, but are not limited to, probiotic strains selected from *Lactobacilli, Bifidobacteria,* or *Enterococci,* e.g., *Lactobacillus reuteii, Lactobacillus acidophilus, Lactobacillus animalts, Lactobacillus ruminis, Lactobacillus johnsonii, Lactobacillus casei, Lactobacillus paracasei, Lactobacillus rhamnasus, Lactobacillus fermentum,* and *Bifidobacterium sp., Enteracoccus faecium* and *Enterococcus sp.* In some embodiments, the probiotic strain is selected from the group consisting of *Lactobacillus reuteri* (NCC2581; CNCM I-2448), *Lactobacillus reuteri* (NCC2592; CNCM I-2450), *Lactobacillus rhamnosus* (NCC2583; CNCM I-2449), *Lactobacillus reuteri* (NCC2603; CNCM I-2451), *Lactobacillus reuteri* (NCC2613; CNCM I-2452), *Lactobacillus acidophilus* (NCC2628; CNCM I-2453). *Bifidobacterium adolescentis* (e.g. NCC2627). *Bifidobacterium sp.* NCC2657 or *Enterococcus faecium* SF68 (NCIMB 10415). The food compositions contain probioties in amounts sufficient to supply from about $10^4$ to about $10^{12}$ cfu/animal/day, preferably from $10^5$ to about $10^{11}$ cfu/animal/day, most preferably from $10^7$ to $10^{10}$ cfu/animal/day. When the probioties are killed or inactivated, the amount of killed or inactivated probioties or their components should produce a similar beneficial effect as the live microorganisms. Many such probioties and their benefits are known to skilled artisans, e.g., EP1213970B1, EP1143806B1, U.S. Pat. No. 7,189,390, EP1482811B1, EP1296S65B1, and U.S. Pat. No. 6,929,793.

In various embodiments, the food compositions contain one or more prebiotics, e.g., fructo-oligosaccharides, gluco-oligosaccharides, gatacto-oligosacchandes, isomalto-oligosaccharides, xylo-oligosaccharides, soybean, oligosaccharides, laetosucrose, lactulose, and isomaltulose. In one embodiment, the prebiotic is chicory root, chicory root extract, mulin, or combinations thereof.

In various embodiments, the food compositions contain a combination of one or more probiotics and one or more prebiotics.

In another aspect the invention provides blended food compositions comprising (1) the food composition of the present invention and (2) one or more other comestible-ingredients or compositions. The comestible ingredient or composition can be any comestible ingredient or composition compatible with the food compositions of the present invention. Preferably, the comestible composition, is one or more dry kibbles suitable for consumption by companion animals, preferably dogs and cats. Preferably the comestible ingredient or composition is selected from the group consisting of extruded kibbles, baked kibbles, extruded treats, and baked treats.

In preferred embodiments, the comestible ingredients or compositions have a moisture content of about 12% or less and an Aw of about 0.65 or less.

The blended food compositions of the invention comprise any suitable amount of the food composition of the present invention. Generally, the food compositions comprise from about 1 to about 99% for the blended food composition, preferably from about 5 to about 99%, most preferably from about 5 to about 95%. The blended food composition has enhanced palatability compared to food compositions comprising the comestible, food ingredients or compositions alone.

In one embodiment, the blended food compositions are formulated to provide "complete and balanced" nutrition for an animal, preferably a companion animal, according to standards established by the Association of American Feed Control Officials (AAFCO). In another embodiment, the food composition is a pet food composition.

In various embodiments, the animal is a companion animal, preferably a dog or a cat, most preferably a dog.

Whether alone or blended, the food compositions can be are coated with a fats and other palatability enhancers, e.g. animal digest.

In another aspect, the invention provides methods for making food compositions comprising (1) mixing one or more functional proteins and one or more cross-linking agent's to produce & base mix; (2) mixing one or more humectant plasticizers and one or more meats to form a meat slurry; (3) mixing the meat slurry and the base mix to form a preconditioned mix; (4) heating the preconditioned mix under pressure; and (5) expanding the heated composition to form the food composition. The resulting food compositions have a realistic meat-like appearance, fed, and texture. In addition, the food compositions are highly palatable compared to other similar food compositions. Further, the food compositions have a moisture content and water activity that eliminates or minimizes spoilage and eliminates the need artificial preservatives such as mold inhibitors.

In various embodiments, the functional proteins are legume proteins, cereal proteins, or combinations thereof. Typically, these functional proteins are mostly undenatured, e.g., soy flour with greater than a 70 protein dispersibility index, soy bean meal with a protein dispersibility index of 20 or higher, soy flakes with a protein dispersibility index of 50 or higher, or vital wheat gluten. Generally, functional proteins include any soy bean derivative including meal, flour, concentrate, flakes, and isolates with a protein dispersibility index of 20 or higher.

In various embodiments, the cross-linking agents are elemental sulfur, sodium metabisulfite, cysteine, or combinations thereof. Typically, the cross-linking agent comprises from about 0.01 to about 3% of the base mix, preferably form about 0.05 to about 2%, most preferably form about 0.1 to about 1%.

Generally, a base mix is made by mixing one or more functional proteins and one or more cross-linking agents in amounts of from about 98 to about 99.95% functional proteins and from about 0.05 to abut 2% cross-linking agents. The base mix is made by placing the functional proteins and the cross-linking agents its a container and stirring, preferably until the mixture is homogenous.

In some embodiments, the base mix is made as described above except that additional proteins such as vegetable proteins (e.g., soybean meal, corn gluten, and/or rice gluten) and/or meat protein meals (e.g. beef, chicken, turkey, and/or fish meals) are used as an ingredient in the base mix. When used, these additional proteins generally comprise from about 15 to about 40% of the base mix, but amounts may vary as described herein.

Generally, a meat slurry is made by grinding meat such as fish, beef, lamb, chicken, pork, turkey, salmon, tuna, or combinations thereof to produce a ground meat composition and mixing the ground meat composition with one or more humectant plasticizers in a meat:humectant plasticizer ratio of from about 20:80 to about 80:20, preferably until the mixture is homogenous. In certain embodiments, certain additional ingredients such, as vitamins and minerals are added to the meat slurry for processing convenience.

Generally, a preconditioned mix is formed by mixing the base mix and the meat slurry in amounts of from about 70 to about 90% base mix and from about 30 to about 10% meat slurry and heating the mixture to a temperature of from about 160 to about 245° F. In one embodiment, the preconditioned mix is formed by mixing the base mix and the meat slurry in amounts of from about 70 to about 85% base mix and from about 30 to about 15% meat slurry and heating the mixture to a temperature of from about 160 to about 212° F. if wanted or desired, colorants can be added to the premix, particularly if colorants were not added to the base mix.

Generally, the preconditioned mix is heated to temperatures of from about 280 to about 420° F. (about 138 to about 216° C.), from about 310 to about 380° F. (about 154 to about 193° C.), at pressures of greater than from about 400 psi, preferably pressures of from about 400 psi to about 1000 psi, most preferably from about 400 psi to about 800 psi. Then, the heated mix is allowed to expand by removing the pressure, typically by removing the heated mix from the device used to heat the preconditioned mix and exposing the heated mix to atmospheric pressure.

Any device suitable for heating the preconditioned mix under pressure and then allowing the heated mixture to expand, typically by removing the pressure, is suitable for making the compositions of the invention.

In one embodiment, the food compositions are produced using an extrusion process, in the extrusion is process, the preconditioned mix is fed to an extruder where the preconditioned mix is subjected to shear, pressure, temperature and/or other process conditions suitable for forming a processed food composition that can be used to make the food composition of the invention. Then, the processed food composition exits the extruder where it expands to form the food compositions of the invention. Such extrusion processes are known to skilled artisans.

In one extrusion process, the preconditioned mix is subjected to shear and further mixing between the rotating extruder screw and the barrel. The screw profile is one designed to impart high shear as known to skilled artisans. The shear, the additional frictional heat and high pressure (generally greater than 400 psi) produces a molten mass having a temperature of from about 310 to about 380° F.

(about 154 to about 193° C.). Upon exiting the extruder, the food molten mass expands to form the food compositions of the invention.

In one embodiment, the moisture of the food composition is from about 12 to about 30% upon exiting the extruder. In another, the moisture of the food composition is from about 14 to about 20% upon exiting the extruder. Evaporative loss lowers the moisture content to from about 7 to about 14% or from about 10 to 14%. If evaporative loss does not lower the moisture to the desired level, the moisture content can be lowered by drying. In this embodiment, the density of the food composition is from about 9 to about 14 lbs/bushel (BU) (about 115 to about 180 grams/liter). The resulting expanded structure of the food composition is highly absorbent and easily absorbs flavoring liquids, if desired.

Other suitable devices can also be used to create an extrusion-like process. For example, heat exchangers that create process conditions such as high pressures and temperatures equivalent to or similar to those created by extruders. Other such devices may be known to skilled artisans.

Food compositions containing probiotics are produced by mixing the probiotic with the food ingredients at any stage of the process so that the probiotics are dispersed in the food composition, preferably uniformly dispersed. Preferably, such probiotics are encapsulated if they are to be inserted into the process before the heating stage. Alternatively, the probiotics are applied to the surface of the food composition, with or without a carrier. Preferably, the probiotics are sprayed onto the food composition. For animal foods, the probiotics can be sprayed onto the surface of the food composition as an ingredient in lipid or other based palatability enhancers. In one embodiment, the probiotics are simply applied to the food composition just before consumption, by mixing with or sprinkling onto the food composition.

Food compositions containing prebiotics are produced by mixing the probiotic with the food ingredients at any stage of the process so that the prebiotics are dispersed in the food composition, preferably uniformly dispersed.

It is believed, without being bound by theory, that the cross-linking agents promote disulfide links that create a matrix in the composition that is responsible for the realistic meat-like appearance, feel, and texture. The matrix is created by the expansion of the food composition as it exits the extruder, the pressure of the composition drops from the elevated pressures in the extruder to atmospheric pressure outside the extruder, typically from greater than about 400 psi to atmospheric pressure. The expansion creates a striated or fibrous appearance that produces the realistic meat-like appearance, feel, and texture characteristic of the novel food composition.

In a further aspect, the invention provides kits suitable for administering the food compositions of the invention to an animal. The kits comprise in separate containers in a single package or in separate containers in a virtual package, as appropriate for the kit component, a food composition of the present invention and one or more of (1) one or more comestible ingredients or compositions suitable for consumption by an animal; (2) instructions for how to combine the food composition with the comestible ingredients or compositions, particularly to produce a blended food composition of the present invention; (3) one or more probiotics; (4) one or more devices for mixing kit components or containing the admixture; and (5) instructions for how to use food compositions and other components of the kit; particularly to enhance the palatability of comestible ingredients or compositions, to promote gastrointestinal health using the probiotics, or to use the devices to prepare and serve the food compositions.

When the kit comprises a virtual package, the kit is limited to instructions in a virtual environment in combination with one or more physical kit components. The kit contains food compositions and other components. Typically, the food compositions and the other suitable kit components (e.g., comestible ingredients) are admixed just prior to consumption by an animal. The kits may contain the kit components in any of various combinations and/or mixtures. In one embodiment, the kit contains a container comprising a food composition of the invention and a container comprising one or more other comestible ingredients or compositions, e.g., pet food kibbles. The kit may contain additional items such as a device for mixing kit components or a device for containing the admixture, e.g., a spoon and/or a food bowl. In another embodiment, the food compositions are mixed with additional nutritional supplements such as vitamins and minerals that promote good, health in an animal.

In another aspect, the invention provides a means for communicating information about or instructions for one or more of (1) the unique texture and appearance of the food compositions of the present invention; (2) the lack of preservatives in the food compositions; (3) the spoilage and shelf-stable characteristics of the food compositions; (4) instructions for feeding the food compositions or blended food compositions to animals; (5) contact information for consumers to use if they have a question about the food compositions or their use; or (6) nutritional information about the food compositions. Useful instructions can include feeding amounts and frequency. The communication means is useful for instructing on the benefits of using the present invention and communicating the approved methods for feeding the food compositions to an animal. The means comprises one or more of a physical or electronic document, digital storage media, optical storage media, audio presentation, audiovisual display, or visual display containing the information or instructions. Preferably, the means is selected from the group consisting of a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a Fire Wire device, a computer memory, and any combination thereof.

In another aspect, the invention provides a package comprising a food composition of the present invention, blended or un-blended, and a label affixed to the package containing a word or words, picture, design, acronym, slogan, phrase, or other device, or combination thereof that indicates that the contents of the package contains a food composition with beneficial properties such as shelf stability, desirable texture, desirable appearance, and lack of preservatives. Typically, such device comprises the words "contains no preservatives", "softness assured", "shelf-stable", "no added water", "enhanced palatability", or an equivalent expression printed on the package. Any package or packaging material suitable for containing the composition is useful in the invention, e.g., bag, box, bottle, can, pouch, and the like manufactured from paper, plastic, foil, metal, and the like. In a preferred embodiment, the package contains a food composition adapted for a particular animal such as a human, canine, or feline, as appropriate for the label, preferably a companion animal food composition for dogs or cats. In a preferred embodiment, the package is a retortable can or pouch comprising a food composition of the present invention.

EXAMPLES

The invention can be further illustrated by the following examples, although it will be understood that these examples are included merely for purposes of illustration and are not intended to limit the scope of the invention unless otherwise specifically indicated.

Example 1

Making a Base Mix 680 kilograms of soy flour and about 260 kilograms of soybean meal were mixed until homogeneous. About 60 kilograms of a mixture comprising salts, vitamins, minerals, amino acids, calcium salts, phosphates, and sulfur was added to this mixture and mixed until homogeneous to produce a base mix.

Example 2

Making a Slurry 550 kilograms of mechanically deboned chicken was ground to 16 mesh (about 1.2 millimeter sieve opening). 450 kilograms of glycerin was mixed into the ground chicken with stirring until the mixture was homogeneous to produce a slurry.

Example 3

Making a Preconditioned Mix 820 kilograms of the base mix from Example 1 and 180 kilograms of the meat slurry from Example 2 were combined with stirring until the mixture was homogeneous to produce a preconditioned mix.

Example 4

Extruding the Composition

The preconditioned mix from Example 3 was heated using extrusion to a temperature of about 160° C. and extruded to produce food composition pieces that have a realistic meat-like appearance, feel, and texture. Analysis of the resulting food composition pieces showed that the pieces comprise about 51% protein, 4% fat, and 12% moisture and that the pieces had an Aw of about 0.6 and a density of about 11 lbs/BU (pounds per U.S. bushel).

Example 5

Palatability Test

Standard dog food kibbles ("Kibble") available for purchase were obtained and mixed with the food composition of the present invention ("Analog") is various amounts as shown in Table 1. The compositions were tested for palatability using a two-bowl palatability test. The results are shown in Table 1.

TABLE 1

| Ration A Control | Ration B Blended Analog and Kibble | % A Consumed | % B Consumed |
|---|---|---|---|
| 100% Kibble | 95% Kibble - 5% Analog | 14 | 86 |
| 100% Kibble | 90% Kibble - 10% Analog | 13 | 87 |
| 100% Kibble | 85% Kibble - 15% Analog | 8 | 92 |
| 100% Kibble | 76% Kibble - 24% Analog | 14 | 86 |
| 100% Kibble | 50% Kibble - 50% Analog | 15 | 85 |

Referring to Table 1, the results show that the blended food compositions showed enhanced palatability. The blended food composition was about 5 times more palatable than the kibble composition alone.

Example 6

Visual Test

The Analog and Kibble compositions as defined above were compared for appearance by visually observing the Analog and the Kibble. The Analog looked like a piece of real meat; the Kibble looked like a cereal product and did not appear to be a piece of real meat.

Example 7

Texture Test

Standard dog food soft compositions ("Soft Pieces") available for purchase, standard texturized vegetable protein compositions available for purchase ("Textured Pieces"), and Analog as defined above were tested and compared for texture by feeling the Soft Pieces, Textured Pieces, and Analog and by testing the Soft Pieces, Textured Pieces, and Analog for compression pressure.

Compression tests were done with an Instron 5500R. Measurements were carried out with a cylindrical probe with a flat surface of 0.25 inch diameter. A crosshead speed of 2 inches per minute was used to compress the kibble placed on a flat plate. The maximum pressure when the piece was compressed 40% was recorded, i.e., measure of softness. The elasticity indicated by the return relative to the original height of the piece was also recorded. At least 15 pieces were measured and the means used for comparison. These results showed that food composition had similar soft characteristics to a commercial soft composition that does not possess the striated appearance of the food compositions of the present invention.

Visually, the Analog looked like a piece of real meat, the Textured Pieces looked somewhat like a piece of real meat, and the Soft Pieces did not look like a piece of real meat but instead looked like a cereal product. The results of the compression test are shown in Table 2.

TABLE 2

| Product | Pressure (psi) to Compress 40% of Original Height | Return after Compression-% of Original Height |
|---|---|---|
| Soft Pieces | 549 ± 15.5 | 89 ± 3.2 |
| Textured Pieces | 2101 ± 902 | 78 ± 14.5 |
| Analog | 164 ± 56.9 | 91 ± 3.3 |

Referring to Table 2, the data shows that the Analog feels like a piece of real meat, the Soft Pieces feels somewhat like a piece of real meat, and the Textured Pieces did not feel like a piece of real meat. Referring to the visual test and the feel test, the advantage of the Analog is that it has both a meat-like appearance and a meat-like feel and texture. Soft dry food compositions available commercially convey a meaty feel. These soft dry compositions also use humectant plasticizers. However, their internal structure is cellular like regular kibbles. Therefore the current soft dry compositions feel meaty but do not look meaty. In comparison, texturized vegetable proteins that are available commercially are hard when dried to obtain shelf stability and, therefore, are not palatable and were so hard that they damaged the gums of the animal consuming the Textured Pieces. These Textured Pieces look meaty but do not feel or taste meaty. In contrast, the Analog of the present invention looks meaty and feels meaty.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings, it is therefore to be understood that within the scope of the appended claims, the invention may be practiced otherwise than as specifically described.

What is claimed is:

1. A method of making a food composition comprising:
   (1) mixing one or more functional proteins and one or more cross-linking agents to produce a base mix;
   (2) mixing one or more humectant plasticizers and one or more meats to form a meat slurry;
   (3) forming a preconditioned mix by mixing the base mix and the meat slurry in a mixture comprising from about 70 to about 90% base mix and from about 30 to about 10% meat slurry and heating the mixture to a temperature from about 160 to about 245° F.;
   (4) after the preconditioned mix is formed, feeding the preconditioned mix into an extruder in which the preconditioned mix is heated to a temperature from 310 to 380° F. under a pressure from about 400 to about 1000 psi to form a heated composition;
   (5) expanding the heated composition to form an expanded food composition having a striated or fibrous meat-like appearance, feel and texture; and
   (6) reducing the moisture of the expanded food composition to form the food composition.

2. The method of claim 1 wherein the preconditioned mix is heated in step (4) at a pressure from about 400 to about 800 psi.

3. The method of claim 1 wherein the heated composition is expanded to a density from about 9 to about 14 lbs/bushel.

4. The method of claim 1 wherein the moisture of the expanded food composition is reduced to about 7 to about 14%.

5. The method of claim 1 wherein the functional proteins are legume proteins, cereal proteins, or combinations thereof.

6. The method of claim 1 wherein the functional proteins are a mixture of (1) from about 20 to about 80% of legume proteins, cereal proteins, or combinations thereof and (2) from about 80 to about 20% of one or more other proteins.

7. The method of claim 6 wherein the other proteins are vegetable proteins, meat protein meals, or combinations thereof.

8. The method of claim 7 wherein the vegetable proteins are soybean meal, corn gluten, rice gluten, or combinations thereof.

9. The method of claim 7 wherein the meat protein meals are beef meal, chicken meal, turkey meal, fish meal, or combinations thereof.

10. The method of claim 1 wherein the cross-linking agents are elemental sulfur, sodium metabisulfite, cysteine, or combinations thereof.

11. The method of claim 1 wherein the humectant plasticizers consist of polyols.

12. The method of claim 11 wherein the polyols are selected from the group consisting of glycerol (glycerin), sorbitol, propylene glycol, butylene glycol, polydextrose, and combinations thereof.

13. The method of claim 11 wherein the polyol is glycerin.

14. A composition having a striated or fibrous meat-like appearance, feel and texture and made according to the method of claim 1 comprising from about 40 to about 90% of the functional proteins, from about 0.05 to about 2% of the one or more cross-linking agents, and the meat slurry, wherein the meat slurry comprises the one or more meats and the one or more humectant plasticizers in a meat:humectant plasticizer ratio of from about 20:80 to about 80:20.

15. The method of claim 1 wherein the humectant plasticizers are 5 to 25% of the food composition.

16. The method of claim 1 comprising:
   mixing the one or more functional proteins and the one or more cross-linking agents in a container to form a proteinaceous composition and stirring the proteinaceous composition until homogenous to produce the base mix; and
   grinding the one or more meats to produce a ground meat composition into which the one or more humectant plasticizers are mixed until the ground meat composition is homogenous to form the meat slurry.

17. The method of claim 1 wherein the heating of the preconditioned mix in step (4) comprises producing a molten mass having a temperature from 310 to 380° F., the molten mass is the heated composition, and expansion of the molten mass in step (5) forms the expanded food composition.

18. The method of claim 1 wherein the preconditioned mix is formed by mixing the base mix and the meat slurry in amounts from about 70 to about 85% base mix and from about 30 to about 15% meat slurry and heating the mixture to a temperature from about 160 to about 212° F.

19. The method of claim 1 wherein the functional proteins are mostly undenatured.

20. A method of making a food composition comprising:
   (1) mixing one or more functional proteins and one or more cross-linking agents to produce a base mix, the one or more functional proteins comprise at least one of legume proteins or cereal proteins, and the one or more cross-linking agents comprise at least one of elemental sulfur, sodium metabisulfite, or cysteine;
   (2) mixing glycerin and one or more meats to form a meat slurry;
   (3) forming a preconditioned mix by mixing the base mix and the meat slurry in a mixture comprising from about 70 to about 85% base mix and from about 30 to about 15% meat slurry and heating the mixture to a temperature from about 160 to about 212° F.;
   (4) after the preconditioned mix is formed, feeding the preconditioned mix into an extruder in which the preconditioned mix is heated to a temperature from 310 to 380° F. under a pressure from 400 to 800 psi to form a heated composition;

(5) expanding the heated composition to form an expanded food composition having a striated or fibrous meat-like appearance, feel and texture; and (6) reducing the moisture of the expanded food composition to about 10 to about 14% to form the food composition.

21. The method of claim 1 wherein the moisture of the expanded food composition is reduced in step (6) by evaporative loss, and the method comprises further reducing the moisture of the expanded food composition by drying if the evaporative loss does not lower the moisture to a desired level.

\* \* \* \* \*